(12) United States Patent
Garin et al.

(10) Patent No.: US 8,734,100 B2
(45) Date of Patent: May 27, 2014

(54) TURBINE STAGE

(75) Inventors: Fabrice Marcel Noel Garin, Boissise la Bertrand (FR); Alain Dominique Gendraud, Vernou la Celle sur Seine (FR); Thierry Lequitte, Cesson (FR); Sebastien Jean Laurent Prestel, Coubert (FR)

(73) Assignee: SNECMA, Paris (FR)

( * ) Notice: Subject to any disclaimer, the term of this patent is extended or adjusted under 35 U.S.C. 154(b) by 525 days.

(21) Appl. No.: 13/169,411

(22) Filed: Jun. 27, 2011

(65) Prior Publication Data

US 2011/0318170 A1 Dec. 29, 2011

(30) Foreign Application Priority Data

Jun. 29, 2010 (FR) ...................................... 10 55204

(51) Int. Cl.
*F01D 9/00* (2006.01)
(52) U.S. Cl.
USPC .................. 415/209.3; 415/173.1; 415/199.5
(58) Field of Classification Search
CPC .......... F01D 9/042; F01D 11/08; F01D 11/12
USPC ................. 415/173.1, 209.3, 199.5
See application file for complete search history.

(56) References Cited

U.S. PATENT DOCUMENTS

| 5,201,846 | A | * | 4/1993 | Sweeney | ..................... | 415/173.6 |
| 5,333,995 | A | * | 8/1994 | Jacobs et al. | ................ | 415/209.2 |
| 6,062,813 | A | * | 5/2000 | Halliwell et al. | .......... | 415/174.5 |
| 6,468,026 | B1 | * | 10/2002 | Bonnoitt et al. | ................... | 415/9 |
| 2003/0035722 | A1 | | 2/2003 | Barrett et al. | | |
| 2006/0251520 | A1 | | 11/2006 | Bart | | |
| 2008/0240915 | A1 | | 10/2008 | Castel et al. | | |

FOREIGN PATENT DOCUMENTS

| EP | 1 637 701 A1 | 3/2006 |
| EP | 1 975 374 A1 | 10/2008 |
| FR | 2 899 273 | 10/2007 |
| GB | 2 378 730 A | 2/2003 |
| WO | WO 2005/003518 A1 | 1/2005 |

OTHER PUBLICATIONS

French Preliminary Search Report issued Mar. 9, 2011, in French 1055204, filed Jun. 29, 2010 (with English Translation of Category of Cited Documents).

* cited by examiner

*Primary Examiner* — Ninh H Nguyen
(74) *Attorney, Agent, or Firm* — Oblon, Spivak, McClelland, Maier & Neustadt, L.L.P.

(57) ABSTRACT

A turbine stage for a turbomachine, the stage comprising a rotor wheel mounted inside a sectorized ring carried by an outer casing, and a sectorized nozzle fastened to the casing downstream from the wheel, each ring sector having a downstream end that is held bearing radially outwards against a cylindrical rail of the casing by means of the nozzle, the casing rail including an annular row of through radial notches reducing the areas for heat exchange by conduction both between the casing and the ring sectors and between the casing and the nozzle.

11 Claims, 3 Drawing Sheets

TURBINE STAGE

FIELD OF THE INVENTION

The present invention relates to a turbine stage of a turbomachine such as an airplane turboprop or turbojet.

BACKGROUND OF THE INVENTION

A turbomachine turbine, in particular a low-pressure turbine, comprises a plurality of stages, each having a rotor wheel mounted to rotate in a cylindrical or frustoconical ring formed by sectors that are fastened together end to end circumferentially on an outer casing of the turbine, and a nozzle located downstream from the wheel and formed by an annular row of stationery vanes carried by the outer casing (FR-A1-2 899 273 in the name of the Applicant).

Hot gas under pressure leaving the combustion chamber of the turbomachine passes between the vanes of the nozzles and flows over the blades of the turbine wheels, thereby having the effect of raising the temperature of the rings.

In known manner, each ring sector presents a downstream end that is kept bearing radially against a cylindrical casing rail via the nozzle. The nozzle has an upstream cylindrical rim for attaching to the casing rail, the rim bearing radially against an outer cylindrical surface of the rail, which has its inner cylindrical surface bearing radially against the downstream ends of the ring sectors. Having the casing rail bear radially against the downstream ends of the ring sectors serves to position the ring sectors radially relative to the casing. Furthermore, the downstream ends of the ring sectors bear axially against the casing rail to provide sealing in operation.

The areas of contact both between the casing rail and the ring sectors and between the casing rail and the nozzle sectors are relatively large, and they form means for conducting heat both between the ring and the casing and between the nozzle and the casing. The casing may thus reach a high temperature that runs the risk of weakening it and of shortening its lifetime.

Furthermore, in operation, the nozzle sectors transmit forces to the casing rail, which rail is subjected to relatively large tangential stresses in its downstream end portion, thereby giving rise to a phenomenon of creep in the casing rail. These tangential stresses are in addition to the above-mentioned thermal stresses and they reduce the lifetime of the casing rail considerably.

OBJECT AND SUMMARY OF THE INVENTION

A particular object of the invention is to provide a solution to these problems that is simple, effective, and inexpensive.

To this end, the invention provides a turbine stage for a turbomachine such as an airplane turboprop or turbojet, the stage comprising a rotor wheel mounted inside a sectorized ring carried by an outer casing, and a sectorized nozzle fastened to the casing downstream from the wheel, each ring sector having a downstream end that is held bearing radially outwards against a cylindrical rail of the casing by means of the nozzle, wherein the casing rail includes an annular row of through radial notches reducing the areas for heat exchange by conduction both between the casing and the ring sectors and between the casing and the nozzle.

The rail of the outer casing of the invention is thus of the festooned type, i.e. it includes notches or hollow portions that are circumferentially separated from one another by solid portions.

Providing through radial notches in the cylindrical rail of the casing serves to reduce the contact areas both between the casing rail and of the ring sectors and between the casing rail and the nozzle sectors, thereby serving in operation to eliminate the heating by thermal conduction of the casing rail, and more generally of the outer casing. Furthermore, the notches serve to lighten the casing and to concentrate the above-mentioned tangential stresses in the ends of the notches, i.e. in zones that are spaced apart from the end portion of the rail and that are therefore less exposed to high temperatures.

Furthermore, the functions of providing radial positioning and sealing for the ring sectors are conserved in the present invention since the radial and axial bearing forces at the downstream ends of the ring sectors against the casing rail remain unchanged.

The number of notches of the casing may be equal to the number of nozzle sectors, and for example lies in the range 16 to 20. These notches are preferably regularly distributed around the longitudinal axis of the turbine. For example, they are made by milling.

Preferably, each notch has a circumferential extent that is less than the circumferential extent of a nozzle sector, and is in axial alignment with said sector. Each nozzle sector may thus be attached to the casing rail via its circumferential end portions.

Each notch may have a circumferential extent of the order of 10° to 20°, approximately. By way of example, each notch may be generally U-shaped.

The nozzle has an upstream annular rim for attaching to the casing rail, said rim bearing radially inwards against an outer cylindrical surface of the casing rail. The axial dimension of the bearing zone between the rim and the casing is preferably less than the depth or the axial dimension of the notches. When the casing rail extends downstream, the notches are formed in its downstream end portion.

Advantageously, the end walls of the notches are outwardly inclined from upstream to downstream in order to obtain better control over the distribution of the above-mentioned tangential stresses.

The invention also provides an outer casing for a turbine stage as described above, the casing including cylindrical rails for attaching nozzles, and wherein at least one of said rails includes an annular row of through radial notches.

The invention also provides a turbomachine such as an airplane turboprop or turbojet, including at least one turbine stage of the invention.

BRIEF DESCRIPTION OF THE DRAWINGS

The invention can be better understood and other details, characteristics, and advantages of the invention appear on reading the following description made by way of nonlimiting example and with reference to the accompanying drawings, in which.

MORE DETAILED DESCRIPTION

Figure 1:
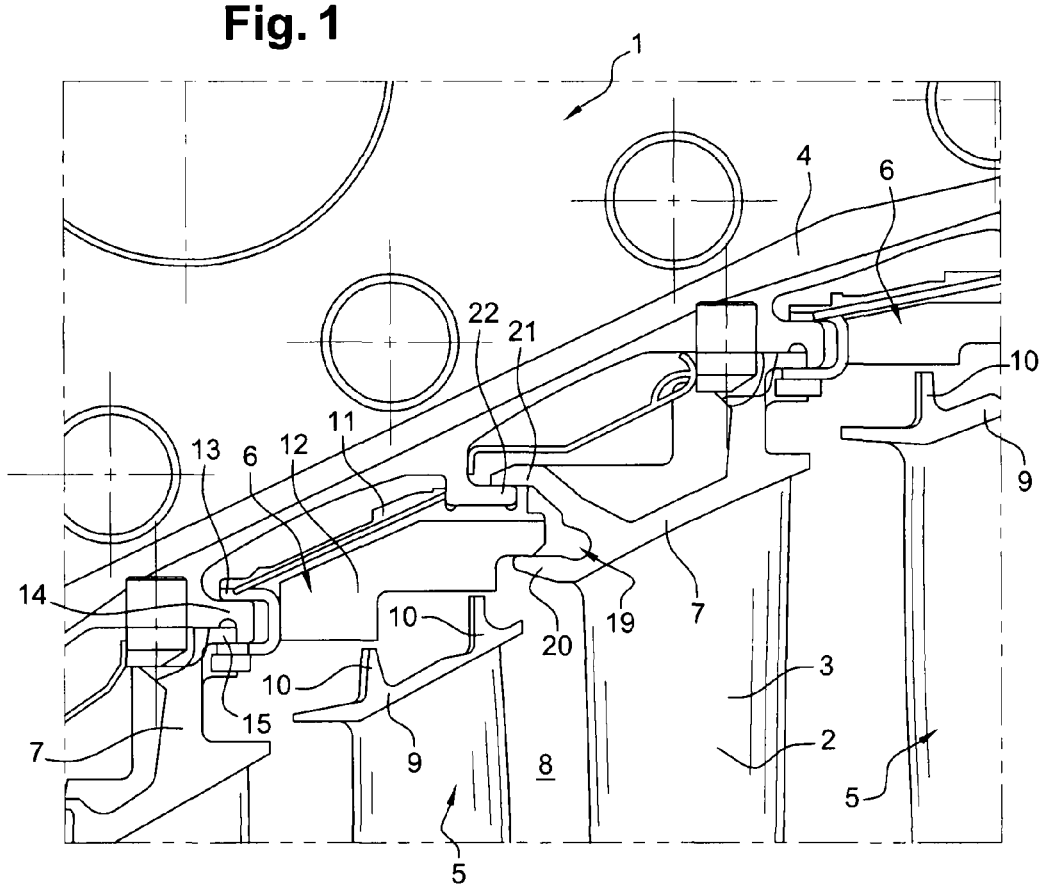
FIG. 1 is a fragmentary diagrammatic half view in axial section of a prior art low-pressure turbine.
Figure 2:
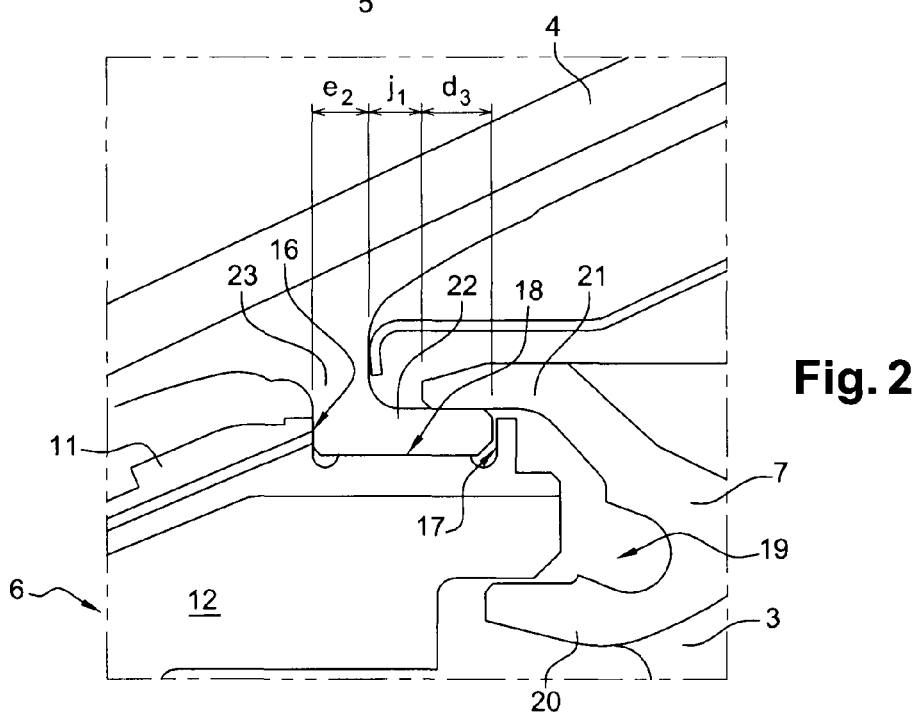
FIG. 2 is an enlarged view of a portion of FIG. 1.
Figure 3:
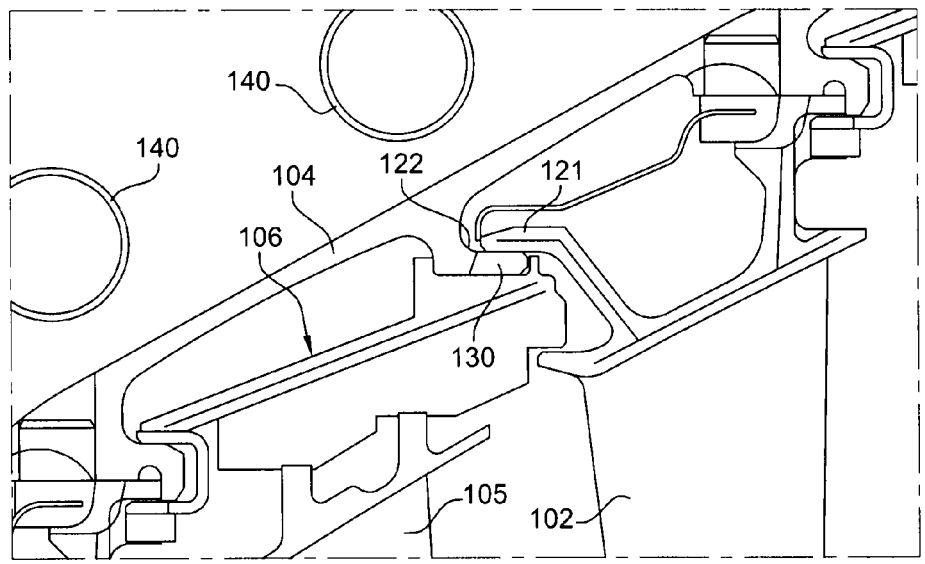
FIG. 3 is a view corresponding to FIG. 1 and showing the invention.
Figure 4:
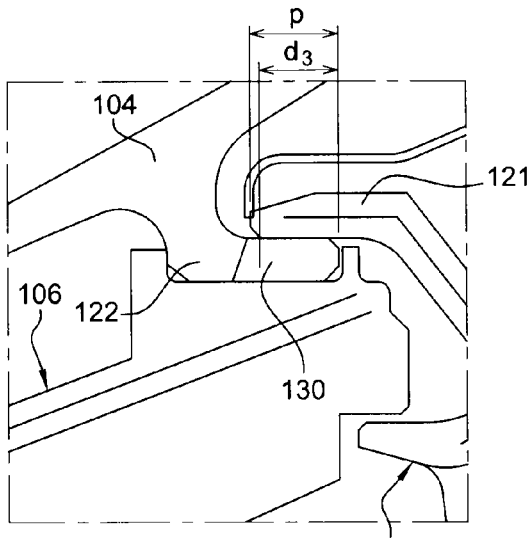
FIG. 4 is an enlarged view of a portion of FIG. 3.

FIGS. 1 and 2 show a low-pressure turbine 1 in a prior art turbomachine, comprising a plurality of stages each having a nozzle 2 carried by an outer casing 4 of the turbine and a rotor wheel 5 is mounted upstream from the nozzle 2 to rotate in a substantially frustoconical ring formed by sectors 6 carried circumferentially end to end by the casing 4 of the turbine.

The nozzles 2 have inner walls (not shown) and outer walls 7 forming surfaces of revolution that define between them an annular passage 8 for passing gas through the turbine and that are connected together radially by vanes 3.

The rotor wheels 5 are secured to a turbine shaft (not shown), and each of them comprises outer platforms 9 and inner platforms (not shown), the outer platform 9 having outer radial ribs 10 surrounded on the outside with small clearance by the ring sectors 6.

Each ring sector 6 has a frustoconical wall 11 and a block of abradable material 12 fastened to the radially inside surface of the frustoconical wall 11 by soldering and/or welding, the block 12 being of the honeycomb type and being designed to be worn away by friction against the ribs 10 of the wheel 5 in order to minimize radial clearance between the wheel 5 and of the ring sectors 6.

The frustoconical wall 11 of the ring sector 6 is secured on its upstream side to a C-shaped or channel section attachment member 13 having a circumferential orientation and having its open side facing axially upstream. This member 13 is for engaging axially from downstream onto a first cylindrical rail 14 of the casing that extends downstream on a downstream circumferential rim 15 of a nozzle 2 situated upstream, so as to hold the nozzle radially on the rail of the casing.

The frustoconical wall 11 of the ring sector includes at its downstream end an annular cavity that is open to the outside and that is defined by an upstream annular face 16, a downstream annular face 17, and a bottom wall 18, the annular faces 16 and 17, and the bottom wall 18 extending around the entire circumference of the ring sector 6.

The downstream end portion of each ring sector 6 is engaged in an annular space 19 defined between two annular rims of the outer wall 7 of the nozzle 2 situated downstream, respectively a radially inner rim 20 and a radially outer rim 21, the rims being oriented upstream.

The outer casing 4 includes a second cylindrical rail 22 extending downstream, which rail is engaged in the cavity of the frustoconical wall 11 of the ring sector 6 and is held therein by the rims 20 and 21 of the nozzle 2.

The upstream annular face 16 of the cavity of the sector 6 forms axial bearing means bearing against the upstream end of the cylindrical rail 22, this serving in operation to provide sealing between the sector 6 and the casing 4.

The bottom wall 18 of the cavity of the sector 6 forms radial bearing means bearing against the inner cylindrical surface of the rail of the casing 22, this defining a proper radial position for the ring sector.

More particularly, the rail 22 presents a radially outer annular surface that bears against the radially outer rim 21 of the nozzle, and a radially inner annular surface that bears against the bottom wall 18 of the ring sector.

Axial clearance $j_1$ is provided between the upstream end of the radially outer rim 21 and the connection zone 23 between the rail 22 and the outer casing 4. This clearance $j_1$ serves to compensate for the effects of expansion and it may become practically zero when the turbomachine is in operation.

The axial dimension of the above-mentioned radial bearing between the casing rail 22 and the bottom wall 18 of the cavity of the wall 11 is imposed, and it is equal to the sum of the clearance $j_1$ plus the thickness $e_2$ in the axial direction of the above-mentioned connection zone 23, plus the axial dimension $d_3$ of the bearing surface of the outer rim 21 of the nozzle against the casing rail 22.

In operation, the gas from the combustion chamber heats the ring sectors 6 and the nozzle sectors 2, with the heat then being transmitted by conduction to the cylindrical rail 22 of the casing, which may reach a critical temperature.

Furthermore, the bearing of the outer rim 21 of the nozzle against the casing rail 22 gives rise to relatively high tangential stresses in the downstream end portion of the rail. This portion of the rail that is in contact with the nozzle 2 and the ring 6 is very hot in operation, and adding tangential stresses to the thermal stresses in this portion of the casing reduces the lifetime of the rail and thus of the casing in significant manner.

A turbomachine turbine of the invention is shown in FIGS. 3 to 6 and it differs from that described above in that the rail 122 of the outer casing 104 is of the festooned type and has a plurality of through radial notches 130.

In the example shown, these notches 130 are regularly distributed around the longitudinal axis of the turbine, and the number of them is equal to the number of nozzle sectors 102, which may be equal to the number of ring sectors 106. By way of example, the number of notches 130 lies in the range 16 to 20.

Figure 7:
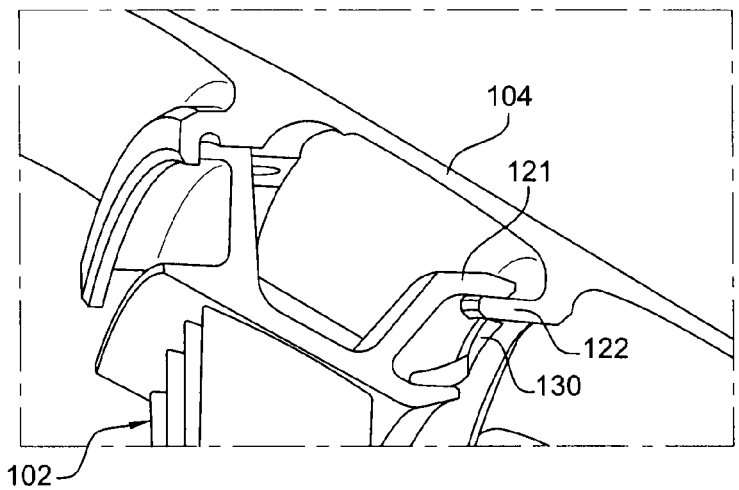
FIG. 7 is a fragmentary diagrammatic view in perspective of the outer casing of a nozzle sector of FIG. 3.
Figure 8:
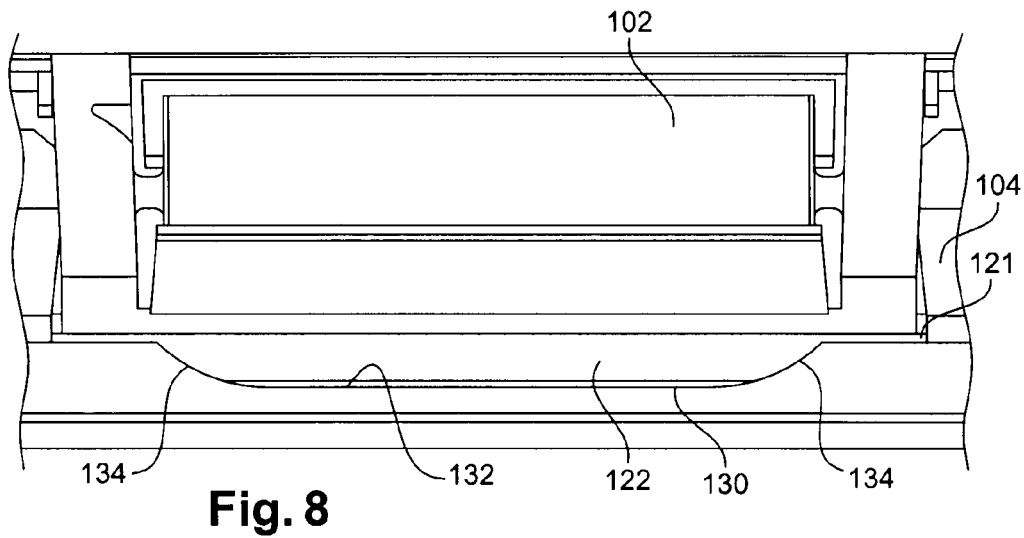
FIG. 8 is a fragmentary diagrammatic view in perspective of the outer casing and of the nozzle sector of FIG. 7, in a radially outwardly oriented direction.

The notches 130 are in axial alignment with the nozzle sectors 102 and they present an angular extent that is less than the angular extent of the nozzle sectors, so that only the circumferential end portions of the radially outer annular rim 121 of each nozzle sector bears radially against the casing rail 122, as can be seen in FIGS. 7 and 8. The angular extent of each notch 130 is of the order 15° to 20° approximately, for example.

The notches 130 have a depth or axial dimension p that is greater than the above-mentioned dimension $d_3$, so as to eliminate any contact between the middle portion of the rim 121 of each nozzle sector and the casing rail 122, thereby limiting heat exchange between the nozzle and of the casing.

The axial length of the casing rail 122 is unchanged relative to the prior art since it is imposed, as explained above.

The casing rail 122 bears radially against downstream end portions of the ring sectors 106 over substantially the entire axial dimension thereof outside the notches and over an axial dimension that is relatively small in the notches, thus serving to reduce heating of the casing by heat conduction.

When the notches 130 are in axial alignment with the ring sectors 106 and when they present an angular extent that is less than the angular extent of the ring sectors, the casing rail bears radially over its entire axial dimension against the circumferential end portions of the downstream end of each ring sector.

Figure 6:
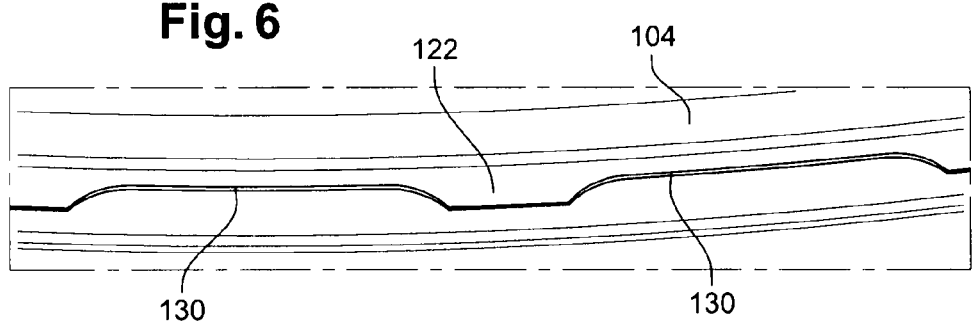

The notches 130 are generally U-shaped, as can be seen in FIGS. 6 and 8. The end wall 132 of each notch is connected to the downstream circumferential edge of the casing rail via connection zones 134 having a large radius of curvature.

The end wall 132 of each notch is outwardly inclined from upstream to downstream (FIGS. 3 and 4), thereby better distributing the tangential stresses induced by the nozzle in operation. These stresses are concentrated at the end walls 132 of the notches and so they are spaced apart from the hottest downstream end portions of the casing rail that are in contact with the nozzle and with the ring.

Figure 5:
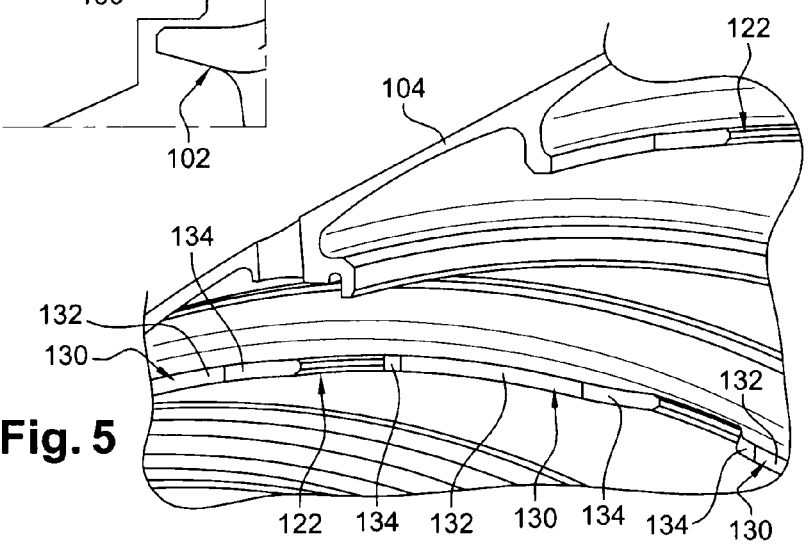
FIGS. 5 and 6 are fragmentary diagrammatic views in perspective of the outer casing of FIG. 3.

The outer casing 104 of the turbine may include a festooned cylindrical rail 122 for connection to the nozzle of each turbine stage. FIG. 5 shows two festooned rails 122 of the casing 104 that may have as many as four, five, or even more such rails.

In one particular configuration, the invention makes it possible to increase the lifetime of the outer casing of a turbine up to 500,000 cycles, whereas its lifetime is no more than 1000 cycles in the prior art. It also makes it possible to reduce the air delivery rates of the manifolds 140 for cooling the outer casing 104 (visible in FIG. 3), and thus improve the performance of the turbine.

What is claimed is:

1. A turbine stage for a turbomachine, comprising a rotor wheel mounted inside a sectorized ring carried by an outer casing, and a sectorized nozzle fastened to the casing downstream from the wheel, each ring sector having a downstream end that is held bearing radially outwards against a cylindrical rail of the casing by means of the nozzle, wherein the casing rail includes an annular row of through radial notches reducing the areas for heat exchange by conduction both between the casing and the ring sectors and between the casing and the nozzle.

2. A turbine stage according to claim 1, wherein the number of notches of the casing is equal to the number of nozzle sectors.

3. A turbine stage according to claim 1, wherein each notch has a circumferential extent that is less than the circumferential extent of a nozzle sector, and is in axial alignment with said sector.

4. A turbine stage according to claim 3, wherein each notch has a circumferential extent of the order of 10° to 20°, approximately.

5. A turbine stage according to claim 3, wherein each notch is generally U-shaped.

6. A turbine stage according to claim 1, wherein the casing rail extends downstream, and the notches are formed in its downstream end portion.

7. A turbine stage according to claim 1, wherein the nozzle has an upstream annular rim for attaching to the casing rail, said rim bearing radially inwards against an outer cylindrical surface of the casing rail, and the axial dimension of the bearing zone between the rim and the casing being less than the depth or the axial dimension of the notches.

8. A turbine stage according to claim 1, wherein the end walls of the notches are outwardly inclined from upstream to downstream.

9. An outer casing for a turbine stage according to claim 1, the casing including cylindrical rails for attaching nozzles, and wherein at least one of said rails includes an annular row of through radial notches.

10. A turbomachine such as an airplane turboprop or turbojet, wherein the turbomachine includes at least one turbine stage according to claim 1.

11. A turbine stage according to claim 1, wherein the number of notches of the casing lies in the range 16 to 20.

* * * * *